United States Patent [19]

Ashcraft et al.

[11] 4,377,616
[45] Mar. 22, 1983

[54] LUSTROUS SATIN APPEARING, OPAQUE FILM COMPOSITIONS AND METHOD OF PREPARING SAME

[75] Inventors: Charles R. Ashcraft, Victor; Hee C. Park, Fairport, both of N.Y.

[73] Assignee: Mobil Oil Corporation, New York, N.Y.

[21] Appl. No.: 335,978

[22] Filed: Dec. 30, 1981

[51] Int. Cl.³ ............................. B32B 3/26; B32B 7/02
[52] U.S. Cl. .................................... 428/213; 156/229; 264/210.7; 428/314.8; 428/315.7; 428/315.9; 428/317.9; 428/323; 428/327; 428/910
[58] Field of Search ................. 428/213, 314.4, 314.8, 428/315.5, 315.7, 315.9, 317.9, 323, 327, 910; 156/196, 229; 264/41, 210.7, DIG. 8

[56] References Cited

U.S. PATENT DOCUMENTS

| | | | |
|---|---|---|---|
| 3,697,367 | 10/1972 | Schwarz | 428/398 |
| 3,783,088 | 1/1974 | Yoshiyasu et al. | 428/315.5 |
| 3,795,720 | 3/1974 | Schwarz | 521/138 |
| 3,841,943 | 10/1974 | Takashi et al. | 428/315.5 |
| 3,870,593 | 3/1975 | Elton et al. | 428/315.5 |
| 4,118,438 | 10/1978 | Matsui et al. | 428/338 |
| 4,163,080 | 7/1979 | Buzio et al. | 428/910 |
| 4,221,697 | 9/1980 | Osborn et al. | 428/220 |
| 4,259,412 | 3/1981 | Buzio et al. | 428/910 |
| 4,303,708 | 12/1981 | Gebhardt et al. | 428/35 |
| 4,342,811 | 8/1982 | Lopatin et al. | 428/220 |
| 4,345,005 | 8/1982 | All et al. | 428/910 |

*Primary Examiner*—William J. Van Balen
*Attorney, Agent, or Firm*—Charles A. Huggett; James F. Powers, Jr.; James P. O'Sullivan, Sr.

[57] ABSTRACT

The present invention is directed to an opaque, biaxially oriented polymeric film structure of lustrous satin appearance comprising a thermoplastic core matrix having a strata of voids; said voids being created by the inclusion within the matrix material of spherical void-initiating solid particles which are incompatible with the matrix material. The void space occupied by the particle is substantially less than the volume of the void. The polymer matrix material is extruded in the form of a film and positioned on opposite surfaces of the film are void free, transparent thermoplastic skin layers adhering to said surfaces. The structure has excellent opacity and extremely high gloss measurement and a lustrous satin appearance.

32 Claims, 3 Drawing Figures

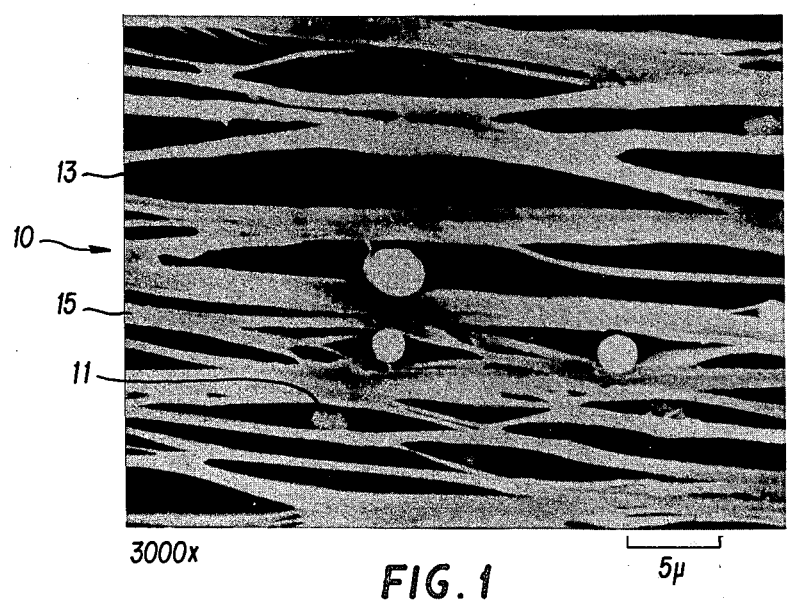
3000x    FIG. 1    5μ
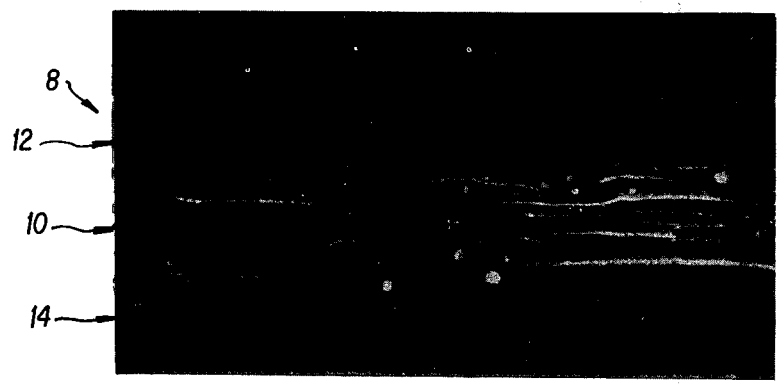
1000x    FIG. 2    5μ

LUSTROUS SATIN APPEARING, OPAQUE FILM COMPOSITIONS AND METHOD OF PREPARING SAME

This invention is concerned with a film structure of lustrous satin appearance and of enhanced opacity and to a method of forming said film structure.

BACKGROUND OF THE INVENTION

It is known that thermoplastic polymers can be loaded with inert fillers, cast into films, and thereafter stretched to form oriented thermoplastic films. This statement is generally true, however, it must be realized that the particular components employed and the specific process parameters employed, particularly when control is difficult, can result in significantly different end products or significantly contribute to the success or failure of obtaining a desired result. For example, U.S. Pat. No. 4,118,438 teaches the use of some materials similar to those contemplated by the present invention, however, the object of the patentees is diameterically opposed to the object of the present invention. This reference is concerned with a transparent polypropylene film containing fine particles of an incompatible polymer dispersed therein. This film manifests bumps or surface projections caused by the dispersed particles and the patentees maintain that this gives the transparent film, non-blocking characteristics. In U.S. Pat. Nos. 3,697,367 and 3,795,720, there is disclosed a process for preparing an uniaxially oriented mixed polymer system. The resulting material has utility as a paper substitute and can be formed into fibers for making sheet paper.

It is an object of the present invention to present a film structure having a lustrous satin appearance of high opacity.

It is another object of this invention to present a film structure having a low water vapor transmission rate.

It is yet another object of the invention to present a process for preparing such a film structure.

SUMMARY OF THE INVENTION

The film structure of the present invention is an opaque biaxially oriented polymer film structure of lustrous satin appearance comprising:
- a thermoplastic polymer matrix core layer within which is located a strata of voids;
- positioned at least substantially within at least a substantial number of said voids is at least one spherical void-initiating particle which is phase distinct and incompatible with the matrix material, the void space occupied by said particle being substantially less than the volume of said void, with one generally cross-sectional dimension of said particle, at least approximating a corresponding cross-sectional dimension of said void;
- void-free, transparent, thermoplastic skin layers adhering to the surfaces of said core layer, said skin layers being of a thickness such that the outer surfaces thereof do not, at least substantially, manifest the surface irregularities of said core layer;
- the population of voids in said core and the thickness of said core being such as to cause a degree of opacity of less than 70% light transmission;
- said structure having a 45° gloss measurement greater than 100%.

The process for preparing the film structure of lustrous satin appearance comprises:
- mixing a first thermoplastic polymeric material with a second material incompatible with said first material to form a core mixture, said second material being of a higher melting point or having a higher glass transition temperature than said first material;
- heating the core mixture to a temperature at least above the melting point of said first material;
- dispersing said second material uniformly throughout the molten first material in the form of microspheres;
- extruding the core mixture in the form of a core layer;
- adherently applying transparent thermoplastic skin films to the surfaces of said core layer in thickness which will not ultimately manifest surface irregularities of said core layer;
- biaxially orienting the film structure at a temperature and to an extent to form opacifying voids in said core layer so as to optimize the degree of opacity, enhance the physical characteristics and impart a lustrous satin appearance to said film structure.

BRIEF DESCRIPTION OF THE DRAWING

FIG. 1 is an electronphotomicrographic view of a cross-section of the core of the subject film structure at a magnification of 3000 times;

FIG. 2 is an electronphotomicrographic view of a cross-section of the film structure showing the core and two skin layers at a magnification of 1000 times.

DESCRIPTION OF THE INVENTION

Figure 3:
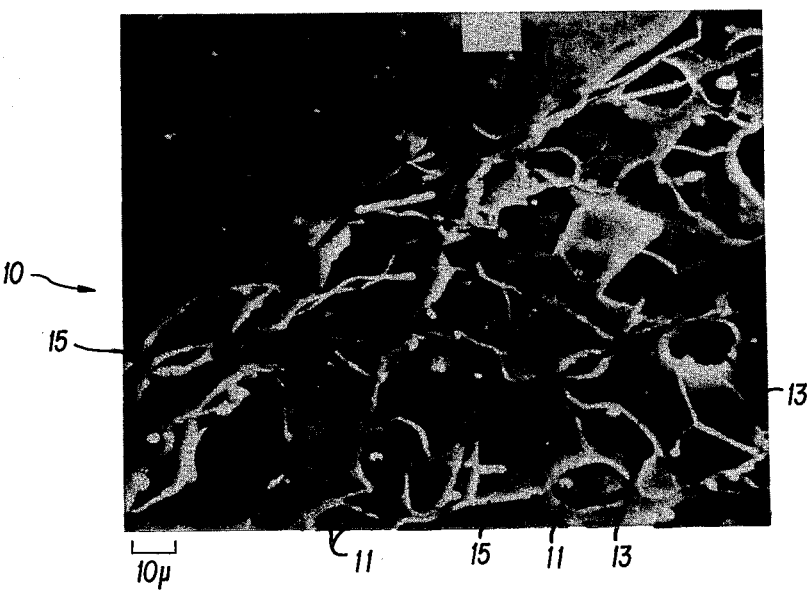
FIG. 3 is an electronphotomicrographic view taken generally perpendicularly to core 10 at a magnification of 700 times.

In order to achieve the unique lustrous satin appearance of the film structure of the present invention, it is important that a particular thickness relationship exist between the thickness dimension of the core and the thickness dimension of the skin layers. It is preferred that the core thickness be from about 30 to about 85% of the overall structure. This, in combination with the population and configuration of the voids in a structure at least about 0.5 mils thick, will materially contribute to the overall degree of opacity of the structure. Likewise, by maintaining the skin thickness within a particular range in relation to the overall structure and to the thickness of the core layer, the overall combination results in the unique lustrous satin appearance of the film combination. It is preferred that the combined skin thickness be about 15 to about 70% of the overall film structure. It is important that the skin layers be sufficiently thick so that the outer surfaces thereof do not manifest the irregularities or surface projections of the core material. If this were not the case, the lustrous appearance of the satin finish would be materially lessened.

It is preferred that the average diameter of the void-initiating particles be from about 0.1 to about 10 microns. These particles should be spherical in shape so as to initiate a void of unusual regularity and orientation in a stratified relationship throughout the matrix material after biaxial orientation of the system. This does not mean that every void is the same size. It means that, generally speaking, each void tends to be of like shape, even though they vary in dimensions, because they are all initiated by a spherical particle. Ideally, any of these voids assume a shape defined by two opposed and edge contacting concave disks, some of which are illustrated in the accompanying drawing.

Experience has shown that optimum characteristics of opacity and satin-like appearance is obtained when the two average major void dimensions are greater than about 30 microns.

The void-initiating particle material, as indicated above, should be incompatible with the core material, at least at the temperature of biaxial orientation.

The core has been described above as being a thermoplastic polymer matrix material within which is located a strata of voids. From this it is to be understood that the voids create the matrix configuration. The term "strata" is intended to convey the understanding that there are a large number of voids creating the matrix and the voids themselves are oriented so that the two major dimensions are aligned in correspondence with the direction of orientation of the polymeric film structure. After each void has been formed through the initiation of a spherical particle, the particle may contribute little else to the system. This is because its refractive index can be close enough to the matrix material that it makes no contribution to opacity. When this is the case, the opacity is principally a function of the light scattering affect which occurs because of the existence of the voids in the system. The opacity of the system can be somewhat enhanced by the inclusion therein of an opacifying pigment dispersed throughout. A particularly preferred proportion of pigment in the core layer can be from about 1 to about 3% by weight of the core. The pigment material is present in such a particle size and shape that it does not, at least in any material sense, contribute any void initiation by itself. The optional presence of the opacifying pigment contributes perhaps 3 to 8% to the degree of opacity of the system.

A typical void of the core is defined as having major dimensions X and Y and minor dimension Z, where dimension X is aligned with machine direction orientation, dimension Y is aligned with transverse direction orientation and dimension Z approximately corresponds to the cross-sectional dimension of the spherical particle which initiated the void.

It is a necessary part of the present invention that orientation conditions be such that the X and Y dimensions of the voids of the core be major dimensions in comparison to the Z dimension. Thus, while the Z dimension generally approximates the cross-sectional dimension of the spherical partical initiating the void, the X and Y dimensions must be significantly greater. In addition, the orientation conditions must be such that the general integrity of the voids is maintained. By this, it is meant that during the orientation which produces the X and Y dimensions, that is, either by simultaneous or sequential machine direction and transverse direction stretching, the temperature conditions must be such as to permit these major dimensions to form without any destruction of the voids in any of its dimensions. The voids are particularly vulnerable to destruction during sequential orientation if the stretching temperature is too low. Even in simultaneous orientation if the temperature is too low, the stretching forces will tend to cause internal shredding and void splitting. This leads to a complete loss of control over the integrity of the individual closed voids, and the consequent integrity of the matrix polymer. Thus, one skilled in the art, following the present general guidelines, can orient at a temperature and to a degree which will yield X and Y dimensions approaching a maximum without causing at least any substantial splitting, shredding or overall lack of void and matrix integrity.

By way of illustration, room temperature biaxial orientation of a polypropylene matrix containing nylon spheres of the size and amount contemplated herein, could not produce the claimed structure. Either void splitting will occur, or, voids of insignificant size would result. As shown in the examples, infra, polypropylene must be oriented at a temperature which happens to be significantly higher than its glass transition temperature. The temperature conditions must permit X and to be at least several multiples of the Z dimension without void splitting at least to any significant degree. If this is accomplished, optimum physical characteristics, including low water vapor transmission rates and a high degree of light scattering is obtained without void splitting or film fibrillating.

As indicated above, the matrix polymer and the void initiating particle must be incompatible and this term is used in the sense that the materials are two distinct phases. The spherical void initiating particles constitute a dispersed phase throughout the lower melting polymer which polymer will, ultimately, upon orientation, become a void filled matrix with the spherical particles positioned somewhere in the voids.

As a result of the biaxial orientation of the film structure described herein, in addition to opacifying the core layer of the structure, the orientation improves other physical properties of the composite layers such as, flex-cracking resistance, Elmendorff tear strength, elongation, tensile strength, impact strength and cold strength properties. In addition to this, an extraordinary, rich looking, lustrous satin appearance is imparted to the film structure. This appearance is not seen in the absence of the skin layers nor if the skin layers are too thin or otherwise substantially reveal the surface imperfections of the core layer. The resulting film can have, in addition to a rich, high quality appearance, low water vapor transmission rate characteristics and low oxygen transmission rate characteristics. This makes the film ideally suited for packaging food products, including liquids. The film also has attractive utility as a decorative wrap material.

Referring now to the drawing, FIG. 1 shows an electron photomicrographic view of a cross-section of the core layer of the film structure of the present invention. 10 represents the overall core structure. 11 designates one of the void-initiating particles. A number of other particles are also visible in FIG. 1. 13 is a cross-section of a typical void. 15 represents a cross-section of a wall segment of the matrix material of the core. In FIG. 2, 12 and 14 are cross-sectional views of the void-free skin layers of the film structure. It is believed apparent by examining FIGS. 1 and 2 that the void-initiating particles were responsible for the initiation of voids 13. Scales illustrating approximately 5 microns are shown in both views.

It is apparent from FIG. 2 that layer 12 and layer 14 are substantially free of any light scattering voids or particles. Moreover, it is clear from FIG. 2 that the surface of layer 12, which is farthest from the core layer, is substantially flat and does not in any way manifest any irregularities present on the surface of the core layer. The same is true of the surface of layer 14. Lack of sharp focus of the outer surface of 14 is responsible for the fuzzyness of the surface. The character and dimensions of these layers are believed to be in some way responsible for the lustrous quality of the satin appearance of the structure described herein.

FIG. 2 illustrates that the skin layers are individually, approximately 25% of the thickness of the core layer. Both cross-sectional views shown in FIGS. 1 and 2 are side views of the film structure at right angles to the machine direction orientation of the films. A cross-sectional view of the film structure at right angles to the transverse orientation direction of the film would reveal a substantially identical structure. Theoretically at least, in films oriented to the same extent in the machine direction and transverse direction, the X-Y dimensions of the voids should be substantially the same. FIG. 3 bears this out.

FIG. 3 is an electronphotomicrographic view taken generally perpendicularly to the partially delaminated core 10. This view shows spherical particles 11 disposed within voids 13 of the matrix material 15.

It is believed that because of the comparative sphericity of the void-initiating particles, the voids are closed cells. This means that there is virtually no path open from one side of the core to the other through which liquid or gas can traverse.

The void-initiating particles can be organic or inorganic so long as they are spherical in shape and within the preferred particle size range so as to initiate the formation of a void, which in a significant number of cases, has a lens-like shape, that is, a lens of the biconvex shape. When a polymeric material is contemplated as the void-initiating particle, it can be a polymer which is co-melted with the polymer of the matrix or core. In this case, it is necessary for it to have a sufficiently higher melting point than the core polymer and be incompatible and capable of assuming a dispersed phase of small spherical particles as the temperature of the co-melted mix is reduced. It is also contemplated that the void initiating particles can be preformed and then uniformly dispersed into a melt of, e.g., polypropylene. This has the advantage of not having to subject the matrix polymer to the temperature of a much higher melting polymer. In this manner, any thermal degradation of the matrix polymer is avoided.

It is believed that because of the number, the shape and the orientation strata-wise of matrix voids, a significantly enhanced light scattering affect is obtained by virtue of the present invention. This affect is further enhanced or magnified by the use of the two transparent skin layers of the size relationship mentioned above.

When preformed spheres are employed, it is the shape and size of the sphere that is important rather than the chemical nature of the material, per se. Thus, solid or hollow organic or inorganic spheres of any type can be employed. Interesting affects can be achieved by the use of spheres of different colors. Since statistically each void has approximately one sphere somewhere within the void, interesting and pleasing color and/or reflectance affects can be imparted to the overall layer structure by the use of spheres of different color absorption or reflectance. The light scattered in a particular void is additionally either absorbed or reflected by the void initiating sphere and a separate color contribution is made to the light scattering in each void.

Examples of a thermoplastic resin which can be the dispersed phase within the matrix material, are the polyamides or nylons of commerce, certain polyesters, such as polyethylene terephthalate acetals, acrylic resins, etc. Inorganic materials include solid or hollow preformed glass spheres, metal beads or spheres, ceramic spheres, etc. In fact, any material which can be formed into the spheres intended without causing thermal degradation to the core material is contemplated.

By the technique of the present invention, light transmission through the film structures contemplated herein can be reduced to as low as about 16%. This would be true in a film having an overall thickness of at least 1.5 mils where the core portion of this is at least 60% and the individual skin layers are 20%.

While the preferred particle size of the sphere is to be from about 0.1 to about 10 microns, it is particularly preferred that the particle size range from about 0.75 to about 2 microns. The void initiating particles can be present in up to about 20% by weight of the core layer prior to orientation, a preferred range being from 2 to about 7 percent by weight.

For convenience and more precise control of the formulation and character of the core layer, a master batch technique can be employed either in the case of forming the spherical particles in situ or in adding preformed spheres to the molten core matrix material. After the formation of a master batch, appropriate dilution of this system can be made by adding additional thermoplastic core matrix material until the desired proportions are obtained.

It is preferred that the core material and the skin material be coextruded. Thereafter, biaxial orientation is carried out to an extent and at a temperature calculated to obtain the maximum degree of opacity without any significant sacrifice in the physical characteristics, including appearance, of the film structure. Obviously, as the materials employed change, the conditions of biaxial orientation will change. By way of exemplification, when employing polypropylene as the material of the core matrix and of the transparent skin layers, and when employing nylon-6 as the void initiating spheres, a machine direction orientation of from 4 to 8 times and a transverse direction orientation of from about 4 to 8 times, at a drawing temperature of from 100° C. to 160° C. to yield a biaxially oriented film of from 0.7 to 3 mils of overall thickness can be obtained.

In the following Examples, characteristics of the film were measured by ASTM method D 1003-61 entitled "Haze and Luminous Transmittance of Transparent Plastics"; ASTM method D 2457-70 entitled "Specular Gloss of Plastic Films"; ASTM method F 372-73, entitled "Water Vapor Transmission Rate" (WVTR); and Stiffness was measured by the method TAPPI Std T498.

EXAMPLE 1

A mixture of isotactic polypropylene (93 parts, MP. 160° C. and a melt index of 4.5) and nylon-6 (7 parts, MP 225° C.) was melted in an extruder provided with a screw of L/D ratio of 20/1. A second extruder was in association with this first mentioned extruder and supplied with the same polypropylene but without the nylon-6 present. A melt coextrusion was carried out while maintaining the cylinder of the core material at a temperature ranging from 190° C. to 220° C. The polypropylene to be extruded as the skin layers, was maintained at a temperature of 220° C. A film structure was coextruded with a core thickness 40% of the total extruded thickness. The skin layers were each approximately 30% of the total thickness. The unoriented film measured approximately 40 mils in thickness. This sheet was subsequently oriented seven by seven and one-half times using a commercially available sequential biaxially orienting apparatus. The MD orientation temperature was about 105° C. and the TD orientation 135° C. The resulting 1.9 mil film had an opacity of 20% transmission and a 45° gloss of 120%. Additionally, the film had unexpectedly high stiffness (120 g/4") as well as an excellent water vapor transmission rate (0.3 g/100$^2$"/24 hrs). The film also had greater than expected hiding power because of its high gloss. This film structure had an unusually rich appearing look of lustrous satin.

EXAMPLE 2

The process of Example 1 was repeated except that 2% TiO$_2$ was included in the core melt mixture. The resulting film structure, extruded and oriented under the same conditions and to the same extent, had a 17 percent light transmission and a gloss of 120%. This film had even greater contact opacity than the film of Example 1 and the same rich lustrous satin appearance.

The TiO$_2$ aids in increasing the contact opacity of the film but does not aid greatly in the measured opacity at lower levels of TiO$_2$. Opacities of from 70% transmission to about 16% light transmission have been achieved using core formulations containing from about 80 to 98% polypropylene and from 1 to 20 percent nylon and from about 1 to about 3% TiO$_2$.

EXAMPLE 3

A mixture of 95 parts by weight of a commercially available high density polyethylene (i.e., 0.95 g/cc) and 5 parts by weight of hollow glass beads having an average diameter of about 3 microns are combined. The polyethylene is brought to a molten state and the glass beads uniformly distributed throughout the melt in the extruder as in Example 1. In the second extruder, a medium density polyethylene (i.e., 0.93 g/cc) is brought to the molten state. As in Example 1, a core and skin combination is formed. Machine direction orientation is carried out at 85° C. and transverse direction orientation is carried out at 95° C. to yield a 1.5 mil film structure of lustrous satin appearance of high opacity. The thickness ratio of the several layers, as in Example 1, is maintained.

EXAMPLE 4

A mixture of 92 parts by weight of poly-4-methyl pentene-1 (density 0.92 g/cc), 7 parts by weight of ceramic spheres of 1.5 microns average diameter and 1 part by weight of pigment grade TiO$_2$ are melt blended as in Example 3. In the second extruder, a linear low density copolymer of ethylene and butene-1, having a density of 0.93 g/cc, is melted and a core and skin combination formed as in Example 3. Machine direction orientation is carried out at 90° C. and transverse direction orientation is carried out at 100° C. A highly voided core having smooth skin layers results in a composite of lustrous satin appearance of high opacity. The individual layers are in the ratio of Example 1 and the overall thickness is about 1.5 mils.

EXAMPLE 5

A mixture of 90 parts by weight of crystal polystyrene, 7 parts by weight of solid glass spheres having an average diameter of about 1.5 microns and 3 parts by weight of pigment grade TiO$_2$ is melt blended as in Example 1. This core blend is extruded and MD stretched at 90° C. and TD stretched at 100° C. Polypropylene unfilled skin layers are separately extruded and biaxially oriented. These layers are bonded to the core layer with a commercially available acrylic adhesive. The result is a highly voided opaque film of about 1.5 mils which is of lustrous satin appearance.

What is claimed is:

1. An opaque, biaxially oriented polymeric film structure of lustrous satin appearance comprising:
    a core thermoplastic polymer matrix material within which is located a strata of voids;
    positioned at least substantially within at least a substantial number of each of said voids, is at least one spherical void-initiating solid particle which is phase distinct and incompatible with said matrix material, the void-space occupied by said particle being substantially less than the volume of said void, with one generally cross-sectional dimension of said particle at least approximating a corresponding cross-sectional dimension of said void;
    void-free, transparent, thermoplastic skin layers adhering to the surfaces of said core layer, said skin layers being of a thickness such that the outer surfaces thereof do not, at least substantially, manifest the surface irregularities of said core layer;
    the population of voids in said core being such as to cause a degree of opacity of less than 70% light transmission;
    said structure having a 45° gloss measurement greater than 100%.
2. The structure of claim 1 wherein said spherical particle is inorganic.
3. The film structure of claim 1 wherein said spherical particle is an organic material.
4. The film structure of claim 3 wherein said organic material is a polymer.
5. The structure of claim 1 wherein said structure is a coextruded structure.
6. The structure of claim 1 wherein said structure is a laminated structure.
7. The structure of claim 1 wherein the core thickness is from about 30 to about 85% of said structure.
8. The structure of claim 1 wherein said skin layers are of the same polymeric material as said matrix material.
9. The structure of claim 1 wherein said skin layers are of a different polymeric material from said matrix material.
10. The structure of claim 1 wherein said voids have a dimension of X, Y and Z, wherein dimensions X and Y are major dimensions and dimension Z is a minor dimension at least generally corresponding to the diameter of said spherical particle.
11. The structure of claim 10 wherein dimensions X and Y are multiples of dimension Z.
12. The structure of claim 1 wherein the spherical particles have an average diameter of about 0.1 to about 10 microns.
13. The structure of claim 1 wherein said core and skin polymer is a polyolefin.
14. The structure of claim 13 wherein said polyolefin is polypropylene.
15. The structure of claim 14 wherein the spherical particles are of a nylon.
16. The structure of claim 15 wherein said nylon is nylon-6.
17. A process for preparing a film structure of lustrous satin appearance comprising:
    mixing a major proportion of a first thermoplastic polymeric material with a minor proportion of a second material of a higher melting point or having a higher glass transition temperature than said first material;

heating the core mixture to a temperature of at least above the melting point of said first material;

dispersing said second material uniformly throughout the molten first material in the form of microspheres;

forming a biaxially oriented core layer of said core mixture, said oriented layer having transparent thermoplastic skin films adherent thereto;

said core layer having been biaxially oriented at a temperature and to a degree to form a strata of opacifying closed cell voids of dimensions X, Y and Z wherein dimensions X and Y are major dimensions and dimension Z is a minor dimension at least generally corresponding to the diameter of said microspheres;

said skin films being at least substantially void-free and of a thickness which will not manifest surface irregularities of said core layer.

18. The process of claim 17 wherein said core layer and skin films are formed by coextrusion.

19. The process of claim 18 wherein said core layer and skin films are biaxially oriented after said skin films are adhered to said core layer.

20. The process of claim 19 wherein the biaxial orientation is simultaneous.

21. The process of claim 20 wherein the biaxial orientation is sequential.

22. The process of claim 18 wherein said coextrusion is sequential with said skin extrusion following said core extrusion.

23. The process of claim 22 wherein said film structure is first machine direction oriented and then transversely oriented.

24. The process of claim 23 wherein said first thermoplastic polymeric material is a polyolefin.

25. The process of claim 24 wherein said polyolefin is polypropylene.

26. The process of claim 25 wherein said second material is a nylon.

27. The process of claim 26 wherein said nylon is nylon-6.

28. The process of claim 27 wherein said nylon-6 and said polypropylene are co-melted.

29. The process of claim 28 wherein said skin film is polypropylene.

30. A process for preparing a film structure of lustrous satin appearance comprising:

mixing a major proportion of polypropylene with a minor proportion of a nylon to form a core mixture;

heating the mixture to effect melting of both materials;

uniformly dispersing said nylon throughout the molten polypropylene in the form of microspheres;

reducing the temperature to below the melting point of the nylon while maintaining the polypropylene molten;

melting a separate proportion of polypropylene;

coextruding said core mixture with the melted polypropylene to form a core layer having skin films of polypropylene on both sides thereof;

biaxially orienting the film structure at a temperature and to a degree to form a strata of opacifying closed cell voids in said core layer, said voids having dimensions X, Y and Z, wherein dimensions X and Y are major dimensions and dimension Z is a minor dimension at least generally corresponding to the diameter of said microspheres;

said skin films being at least substantially void-free and of a thickness which will not manifest surface irregularities of said core layer.

31. The process of claim 30 wherein said orientation temperature is greater than about 100° C.

32. The process of claim 31 wherein said structure is oriented to from about 4 to about 8 times in both directions.

* * * * *